US010397208B2

United States Patent
Eramian

(10) Patent No.: US 10,397,208 B2
(45) Date of Patent: Aug. 27, 2019

(54) AUTHENTICATION VIA ITEM RECOGNITION

(71) Applicant: PAYPAL, INC., San Jose, CA (US)

(72) Inventor: David Edward Eramian, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 30 days.

(21) Appl. No.: 14/967,112

(22) Filed: Dec. 11, 2015

(65) Prior Publication Data

US 2017/0171177 A1    Jun. 15, 2017

(51) Int. Cl.
| | |
|---|---|
| H04L 29/06 | (2006.01) |
| G06K 9/00 | (2006.01) |
| G06K 9/62 | (2006.01) |
| G06F 21/32 | (2013.01) |
| G06F 21/45 | (2013.01) |
| H04W 12/06 | (2009.01) |
| H04W 88/02 | (2009.01) |

(52) U.S. Cl.
CPC ............. H04L 63/08 (2013.01); G06F 21/32 (2013.01); G06F 21/45 (2013.01); G06K 9/00885 (2013.01); G06K 9/6202 (2013.01); G06K 9/6215 (2013.01); H04L 63/102 (2013.01); H04L 63/105 (2013.01); H04L 63/107 (2013.01); H04W 12/06 (2013.01); G06F 2221/2111 (2013.01); H04W 88/02 (2013.01)

(58) Field of Classification Search
CPC ..... H04L 63/08; H04L 63/102; H04L 63/105; H04L 63/107; G06K 9/00885; G06K 9/6202; G06K 9/6215

USPC ............................................................ 726/7
See application file for complete search history.

(56) References Cited

U.S. PATENT DOCUMENTS

| | | | |
|---|---|---|---|
| 8,239,924 B2 | 8/2012 | Ficko et al. | |
| 9,094,775 B1 * | 7/2015 | Fujisaki | H04W 4/02 |
| 9,361,507 B1 * | 6/2016 | Hoyos | G06K 9/00073 |
| 9,582,843 B2 * | 2/2017 | Leonard | G06T 1/0042 |
| 9,767,358 B2 * | 9/2017 | Xue | H04N 5/23219 |
| 2002/0095601 A1 * | 7/2002 | Hind | H04L 9/3231 726/22 |
| 2006/0253578 A1 * | 11/2006 | Dixon | G06Q 10/06 709/225 |
| 2007/0254631 A1 * | 11/2007 | Spooner | G06F 21/6218 455/411 |

(Continued)

OTHER PUBLICATIONS

Henning, K., et al, 'Stable Image Acquisition for Mobile Image Processing Applications', Proc. of SPIE-IS&T Electronic Imaging SPIE vol. 9404, 94040N, 2015 SPIE-IS&T, vol. 9404 94040N-1, entire document, http://www.imaging.org/site/PDFS/Reporter/Articles/2015_30/Rep30_1_2015EI_9404-22_Henning.pdf.*

(Continued)

*Primary Examiner* — Luu T Pham
*Assistant Examiner* — Ronald Baum
(74) *Attorney, Agent, or Firm* — Haynes and Boone LLP

(57) ABSTRACT

Systems and methods for authenticating a user are provided. A user specifies one or more items for authentication and provides images of the one or more items. When the user opens up a mobile application, a camera on the mobile device is activated and takes a picture of an item in its field of view. If the picture matches one of the images of the items, the user is authenticated.

20 Claims, 3 Drawing Sheets

(56) References Cited

U.S. PATENT DOCUMENTS

| | | | | |
|---|---|---|---|---|
| 2008/0169927 A1* | 7/2008 | Graves | G06Q 10/10 | 340/572.1 |
| 2010/0048242 A1* | 2/2010 | Rhoads | G06F 17/30244 | 455/556.1 |
| 2011/0213700 A1* | 9/2011 | Sant'Anselmo | G06Q 10/10 | 705/39 |
| 2011/0276396 A1* | 11/2011 | Rathod | G06F 17/30867 | 705/14.49 |
| 2012/0230540 A1* | 9/2012 | Calman | G06K 9/00221 | 382/103 |
| 2012/0233000 A1* | 9/2012 | Fisher | G06Q 30/02 | 705/14.71 |
| 2012/0278155 A1* | 11/2012 | Faith | G06Q 20/40145 | 705/14.26 |
| 2013/0191213 A1* | 7/2013 | Beck | G06Q 30/0267 | 705/14.53 |
| 2013/0290172 A1* | 10/2013 | Mashinsky | G06Q 20/12 | 705/39 |
| 2014/0068740 A1* | 3/2014 | LeCun | H04L 63/0861 | 726/7 |
| 2014/0129942 A1* | 5/2014 | Rathod | H04N 21/44222 | 715/720 |
| 2014/0162598 A1* | 6/2014 | Villa-Real | H04M 1/66 | 455/411 |
| 2014/0201094 A1* | 7/2014 | Herrington | G06K 9/00577 | 705/317 |
| 2014/0201126 A1* | 7/2014 | Zadeh | G06K 9/627 | 706/52 |
| 2014/0214670 A1* | 7/2014 | McKenna | G06Q 20/40145 | 705/44 |
| 2014/0279458 A1* | 9/2014 | Holman | G06Q 20/227 | 705/40 |
| 2014/0317734 A1* | 10/2014 | Valencia | G06F 21/552 | 726/22 |
| 2014/0366128 A1* | 12/2014 | Venkateswaran | H04L 63/08 | 726/19 |
| 2015/0089568 A1* | 3/2015 | Sprague | H04L 63/0876 | 726/1 |
| 2015/0229625 A1* | 8/2015 | Grigg | H04L 63/08 | 726/6 |
| 2015/0235208 A1* | 8/2015 | Murphy | G06Q 20/382 | 705/75 |
| 2015/0244699 A1* | 8/2015 | Hessler | H04W 12/06 | 726/7 |
| 2016/0012465 A1* | 1/2016 | Sharp | G06Q 20/18 | 705/14.17 |
| 2016/0057565 A1* | 2/2016 | Gold | H04W 4/008 | 455/41.1 |
| 2017/0116498 A1* | 4/2017 | Raveane | G06K 9/6257 | |

OTHER PUBLICATIONS

Choras, R., 'A Review of Image Processing Methods and Biometric Trends for Personal Authentication and Identification', International Journal of Circuits, Systems and Signal Processing vol. 10, 2016, entire document, http://www.naun.org/main/Naun/circuitssystemssignal/2016/b382005-aaa.pdf.*

* cited by examiner

AUTHENTICATION VIA ITEM RECOGNITION

BACKGROUND

Field of the Invention

The present invention generally relates to verification of user identity, and more particularly to verification of user identity with an item associated with the user using computer vision technology.

Related Art

A typical authentication scheme includes several steps, such as opening an application, entering a user name and password, and answering a security question. Consumers want a simpler, yet secure way to access applications on a user device.

Accordingly, a need still exists for systems and methods that provide a more efficient way to authenticate a user.

Figure 1:
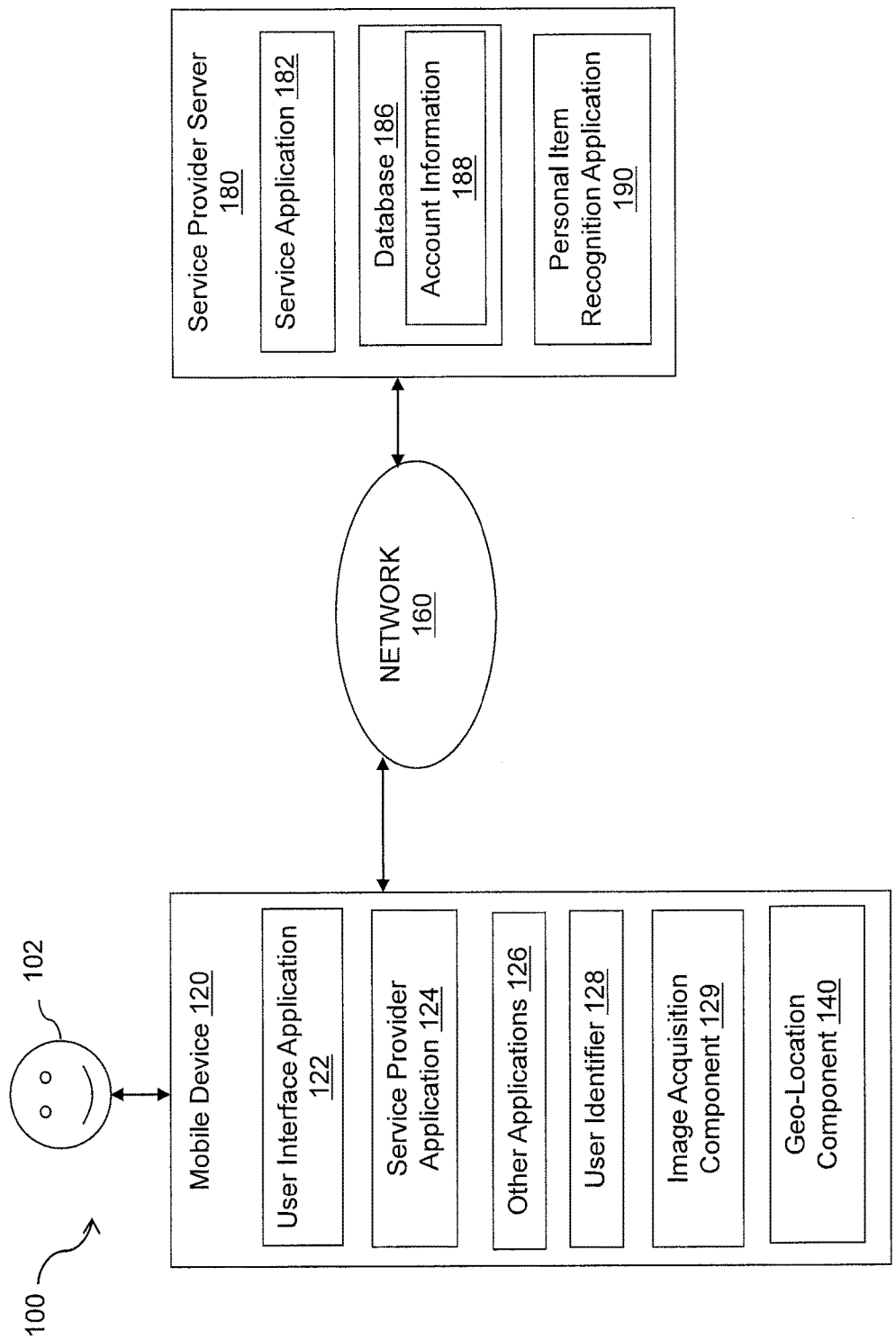
FIG. 1 is a block diagram illustrating a system for authenticating a user according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods that allow a user to electronically authenticate himself or herself to a mobile application using an item associated with the user, including a personal item. The personal item can be, for example, jewelry (e.g., a wedding ring), keys, clothing (e.g., a personalized t-shirt), accessories (e.g., socks or a handbag), keychains, pictures, tools, or books. In particular, a user is authenticated when an image of the personal item is recognized as matching a reference or stored image of a personal item designated for authentication.

Advantageously, authentication is simplified because the user is not required to enter or input a username and/or password. Instead, the user merely opens a mobile application and makes sure that the designated item for authentication is in the field of view of a camera of the mobile device. If the captured image and reference image match, the user is provided access to a secure account. If not, the user is denied access to the account. In addition, it is less likely that an unauthorized individual will be able to gain access to an account of the user because the individual would have to know the particular personal item and make a copy of the item.

As such, embodiments described herein address problems created by technology through a solution rooted in computer technology. In particular, the problems associated with electronic authentication (e.g., theft of user names and passwords, greater security needs, etc.) are created by technology and require a more robust way to identify an individual electronically and remotely. The solutions to these problems are rooted in computer technology and are directed to methods of addressing specific problems associated with electronic authentication. For example, requiring recognition of a personal item to log in to an application is not conventional. The present disclosure uses computer vision technology to recognize a designated personal item before a user is granted access to an account, which is also unconventional.

FIG. 1 shows one embodiment of a block diagram of a network-based system 100 that is configured to authenticate an individual based on recognition of a personal item according to an embodiment of the present disclosure. Any of the systems or machines shown in FIG. 1 may be, include, or otherwise be implemented in a special-purpose (e.g., specialized or otherwise non-generic) computer that has been modified to perform one or more functions described herein for that system or machine. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes a mobile device 120 (e.g., a smartphone) and at least one service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

Mobile device 120, in one embodiment, is utilized by a user 102 to interact with service provider server 180 over network 160. Mobile device 120, in various embodiments, may be implemented using an appropriate combination of hardware and/or software configured for wired and/or wireless communication over network 160 and for performing the functions described herein. In various implementations, mobile device 120 may include at least one of a smartphone, wireless cellular phone, satellite phone, tablet (e.g., iPad™ from Apple®), laptop computer, wearable device (e.g., smart watch or Google Glass), notebook computer, and/or other types of computing devices.

Mobile device 120, in one embodiment, includes a user interface application 122, which may be utilized by user 102 to access applications (e.g., service provider application 124) and to provide instructions to service provider server 180 over network 160. In one aspect, user 102 may login to an account related to user 102 via user interface application 122.

In one implementation, user interface application 122 comprises a software program, such as a graphical user interface (GUI), executable by a processor that is configured to interface and communicate with service provider server 180 via network 160. In another implementation, user interface application 122 comprises a browser module that provides a network interface to browse information available over network 160. For example, user interface application 122 may be implemented, in part, as a web browser to view information available over network 160.

Mobile device 120, in several embodiments, includes service provider application 124, which allows user 102 to interact with the service provider. Service provider application 124 may be downloaded to mobile device 120 from an app store and/or from a service provider website and installed on mobile device 120. The service provider application 124, in various embodiments, allows user 102 to track his or her balance with the service provider, check in to pay from mobile device 120, order ahead at restaurants, choose how to pay for an item, and/or send money to a friend.

The service provider application 124 may be implemented by one or more hardware components, software components, firmware components, and/or a combination thereof. For example, the service provider application 124 may be implemented by a computer program stored on one or more types of computer-readable storage media to be executed by one or more processors of the mobile device 120.

Mobile device 120, in various embodiments, may include other applications 126 as may be desired in one or more embodiments of the present disclosure to provide additional features available to user 102. In one example, such other applications 126 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, other applications 126 may interface with user interface application 122 for improved efficiency and convenience.

Mobile device 120, in one embodiment, may include at least one user identifier 128, which may be implemented, for example, as operating system registry entries, cookies associated with user interface application 122, identifiers associated with hardware of mobile device 120, or various other appropriate identifiers. User identifier 128 may include one or more attributes related to user 102, such as personal information related to user 102 (e.g., one or more user names, passwords, photograph images, biometric IDs, addresses, phone numbers, social security number, etc.). In various implementations, user identifier 128 may be passed with a user login request to service provider server 180 via network 160, and user identifier 128 may be used by service provider server 180 to associate user 102 with a particular user account maintained by service provider server 180.

In some embodiments, mobile device 120 includes an image acquisition component 129, for example, a camera (e.g., a digital camera or video camera). The image acquisition component 129 may be any device component capable of capturing images of objects and/or people from the environment. According to certain embodiments, image acquisition component 129 includes a rear-facing camera that is automatically activated to take an image of item in its field of view when service provider application 124 is opened by user 102. The rear-facing camera can detect that the user 102's face is not in its field of view. In some embodiments, a front-facing camera may be used.

Mobile device 120, in various embodiments, includes a geo-location component 140 configured to determine, track, monitor, and/or provide an instant geographical location of mobile device 120. Mobile device 120 can determine a current location of mobile device 120 using various location determination techniques. For example, mobile device 120 can determine a current location using a Global Positioning System (GPS) signal, by triangulating positions of wireless access points, or by a current cell identifier of a cellular communications network.

In one implementation, the geographical location may include GPS coordinates, zip-code information, area-code information, street address information, and/or various other generally known types of location information. In one example, the location information may be directly entered into mobile device 120 by user 102 via a user input component, such as a keyboard, touch display, and/or voice recognition microphone. In another example, the location information may be automatically obtained and/or provided by the mobile device 120 via an internal or external monitoring component that utilizes a GPS, which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using mobile device 120 via a check-in device at a location, such as a wireless beacon (e.g., Bluetooth beacon or Bluetooth low energy (BLE) beacon). This helps to save battery life and to allow for better indoor location where GPS typically does not work.

Service provider server 180, in various embodiments, may be maintained by a service provider that provides online services and/or processing for information and/or financial transactions. As such, service provider server 180 includes a service application 182, which may be adapted to interact with the mobile device 120 over the network 160 to facilitate the receipt and analysis of information from mobile device 120. In one example, service provider server 180 may be provided by a service provider such as PayPal®, Inc. of San Jose, Calif., USA.

The service provider server 180, in one embodiment, may be configured to maintain one or more user accounts and merchant accounts in an account database 186 each of which may include account information 188 associated with one or more individual users (e.g., user 102) and merchants. For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials (e.g., one or more items) to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

Service provider server 180, in an embodiment, stores reference image information in database 186, receives captured image information from mobile device 120, compares the captured image information with the stored reference image information, and makes a determination whether the captured image information sufficiently matches reference image information. Reference image information can include a location associated with a reference image or images surrounding the reference image. In certain embodiments, service provider 180 directly receives the captured image information from mobile device 120 over network 160. In some embodiments, service provider server 180 receives the information by accessing and/or retrieving the captured image information on mobile device 120.

Service provider server 180, in one embodiment, utilizes a personal item recognition application 190 to determine whether or not to authenticate user 102. In various embodiments, the personal item recognition application 190 receives one or more images of a personal item of user 102 from mobile device 120 and accesses stored images of personal items designated for authentication to determine whether or not grant access to a user account. In various embodiments, computer vision algorithms are used for finding and matching images, for example, for finding corresponding features in two images. In certain embodiments, the computer vision algorithms find and compare only a subset of all features in the images to save time.

Figure 2:
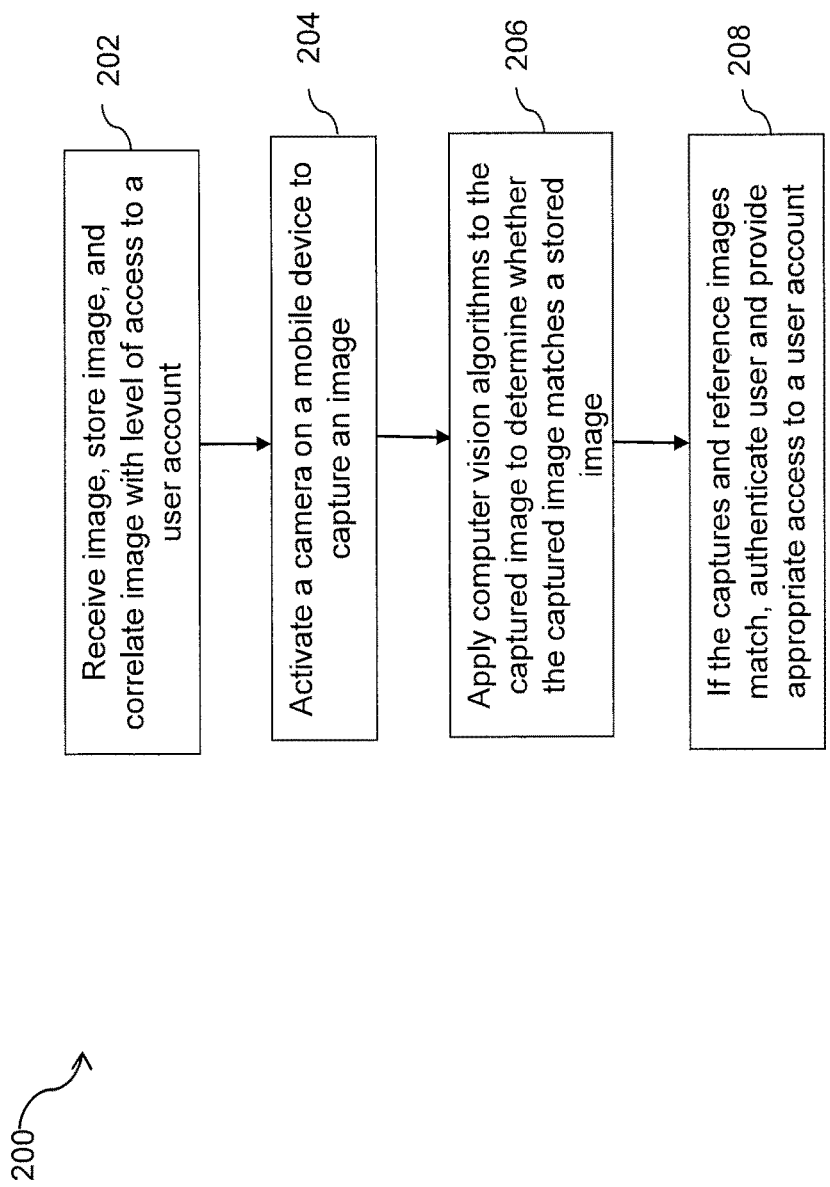
FIG. 2 is a flowchart showing a method of authenticating a user according to an embodiment of the present disclosure.

Referring now to FIG. 2, a flowchart of a method 200 of authenticating a user is illustrated according to an embodiment of the present disclosure. In various embodiments, the user 102 registers with a service provider, which runs a mobile application. Registration may include signing up for the service and agreeing to any terms required by the service provider, such as through a user device. In one embodiment, the user device is a mobile computing device, such as a smartphone, a PC, or a computing tablet. In other embodiments, registration may be done completely through the user device, partially through the user device, or without using the user device, such as through a phone call or in-person visit to a representative of the service provider.

The user may be requested to provider specific information for registration, such as, but not limited to, a name, address, phone number, email address, picture, a user name for the account, a password or PIN for the account, or other biometric identification such as a fingerprint. The type of information may depend on whether the user already has an account with the service provider. Requested information may be entered through the user device or other means, including voice or manual key entry. Once all the requested information is received and confirmed, the service provider may create an account for the user.

The user 102 also designates one or more personal items to be used for authentication. In some embodiments, the user 102 provides an image of the one or more personal items to the service provider and designates each item with a certain level of access. For example, the user 102 captures a photograph or a video of the personal items. The photographic or video image may be captured by a rear-facing camera of the mobile device 120. In an embodiment, an item that is more uniquely identifiable can provide the highest level of access (e.g., full access or higher spending limits) to the mobile application, while an item that is not as uniquely identifiable provides a lower level of access (e.g., user 102 can only view transactions, but cannot perform any transactions, or lower spending limits). For example, a class ring having a distinctive shape, words, symbols, and/or characters can be designated for a higher level of access, while a Mickey Mouse doll can be designated for a lower level of access.

In various embodiments, the user 102 may be prompted to take a picture of the front, back, and/or sides of the personal item. In some cases, preliminary optical character recognition (OCR) or pattern matching may be performed on the picture to extract text or other distinguishable features that appear on the personal item. For example, the personal item may have one or more distinguishing features, such as specific colors, shapes, words, characters, symbols, or pictures.

In different embodiments, location of the captured image may also be captured. For example, when a photo is captured of an image of a photo on a wall of the user's office, the image can be associated with the location of the user's office, such as determined through GPS or other location determining components on the mobile device 120. Location information may not be as important with items that the user 102 typically moves or carries around, such as a wedding ring. However, with items that are more stationary and located in more secure or user-specific locations, location information can be valuable to better authenticate the user 102. Furthermore, reference images need not be personal items of the user 102. For example, the items may belong to an employer or a merchant or may be a public landmark visible from an office of the user 102. More generally, references images may be any image that can be associated with the user. As such, descriptions herein that reference personal items can include items that may not be categorized as personal to the user. Advantageously, the user 102 can select any item for the reference image so that only the user 102 knows what the item is and in some embodiments, its specific location.

In certain embodiments, both the captured image and the location of the captured image must be satisfied before user 102 is authenticated. For example, a keychain may be designated for authentication and the location of the keychain may be determined to be at the office of user 102. Before user 102 is authenticated, the captured image must be of the keychain and the location of the captured image must be the office of user 102. In another example, a fireplace may be designated for authentication and the location of the fireplace may be determined to be at the home of user 102. To be authenticated, the captured image must be of the fireplace and the location of the captured image must be the office of user 102.

In some embodiments, spending limits may be associated with portability of the designated item for authentication. For example, a class ring that is portable can be designated for lower spending limits, while a fireplace can be designated for higher spending limits.

At step 202, the service provider server 180 and/or service provider application 124 receives image(s) of one or more personal items from user 102 (e.g., from mobile device 120), stores the image(s) of the one or more personal items in a database, and correlates each personal item with a certain level of access to a user account with the service provider. For example, user 120 may designate a necklace for authentication and provide an image of the necklace to the service provider. User 102 specifies that the necklace provides full access (or higher spending limits) to his or her user account with the service provider. The user 102 may also designate a Christmas figurine for authentication and provide an image of the figurine to the service provider. User 102 further specifies that when the figurine is presented, the service provider should only allow a user to pay for certain items (e.g., food), but not others (e.g., alcohol, cigarettes), or that user 102 has lower spending limits. The service provider stores the images of the necklace and Christmas figurine, along with each object's level of access.

In certain embodiments where there is more than one personal item designated for authentication, user 102 may require that the items be present in the same captured image, or that the captured images of the items be located in the same location. For example, user 102 can designate a stapler and a table calendar as items for authentication, and that both the stapler and table calendar must be present in a single captured image to gain full or partial access to a user account. User 102 may require that the location of the single captured image be a specific office building. In another embodiment, user 102 can specify that two separate images of the stapler and table calendar can be received, but the location of both images must be the office of user 102.

When the user 102 wants to access service provider application 124, he or she opens the application 124 by, for example, tapping on the application 124. At step 204, when application 124 opens, application 124 activates a rear-facing camera on mobile device 120. The rear-facing camera can detect an item in its field of view, and take multiple pictures or capture multiple images of the item in a few seconds.

In some embodiments, user 102 may release geo-location information to the mobile device 120 (or service provider server 180) by, e.g., setting release parameters. In one aspect, the user geo-location information includes user information related to a physical location or position of the mobile device 120, which are passed to the mobile device 120 (or service provider server 180 via the network 160). The user geo-location information may include GPS coordinates (e.g., longitude and latitude) inherent to the mobile device 120, such as a mobile cellular phone, and/or zip-code information. The user geo-location information may include user identifier information identifying the user 102. The user 102 may manually set geo-location information, such as a zip code and/or longitude and latitude coordinates. In various embodiments, the location of user 102 can serve as an additional layer of security for user authentication. For example, the application 124 can determine the location of user 102 and analyze whether the location is associated with past locations of user 102 and/or an account associated with user 102.

At step 206, the service provider server 180 or the application 124 applies computer vision algorithms to the captured image(s) to determine whether the captured image(s) matches any of the stored image(s). For example, server 180 or application 124 may use image processing and/or feature detection and matching. Image processing preprocesses the image and converts it into a form suitable for analysis.

The server 180 or application 124 may first process or sharpen any images or data before conducting a visual analysis of the images. For instance, a portion of the image(s) may be processed by exposure correction and color balancing, reduction of image noise, increasing sharpness, or straightening an image by rotating it.

Once the image is processed, feature detection and matching can be employed. For example, at least a portion of a captured image is compared to a reference photographic or video image. First, features in the reference image that can be accurately tracked are found. Next, features in the captured image are independently detected and then matched to the features in the reference image. For example, colors, shapes, words, symbols, or characters in the captured and reference images can be compared. Image recognition algorithms may be applied to the image to detect the features.

In some embodiments, the server 180 or the application 124 generates a score, which may be a confidence threshold or "best guess" of the accuracy of the outcome of the verification process. For example, the server 180 or application 124 can indicate that the captured image and the reference image match to a confidence level of 90%. In certain embodiments, the user 102 can specify a certain minimum or threshold confidence score on the authentication outcomes before access to a user account is granted. In other embodiments, the service provider application 124 has a threshold or minimum score necessary to allow user 102 to proceed. In various embodiments, user 102 can specify that the captured image must be identical to the reference image (for example, for an item that is not uniquely identifiable). User 102 can also specify that as long as most (e.g., more than 50%) of the captured image is similar to the reference image, there is a match and he or she should be authenticated.

In various embodiments, the location of the item is relevant, and the location of the captured image is compared to the location of the reference image to determine whether they match. For example, if the reference image is a painting in the office of user 102, the service provider server 180 or service provider application 124 analyzes the captured image to determine whether the locations in the two images are a close enough match and provides a score as discussed above. In one embodiment, the server 180 or application 124 compares the color of the wall that the painting is hanging on to determine if the locations match.

At step 208, if the captured and reference images match (and in some cases, if the captured reference image location and the reference image location match), service provider server 180 or service provider application 124 authenticates the user 102 and the appropriate or corresponding access is granted to user 102.

In some embodiments, if the captured image and reference image do not match (including locations that do not match), the user 102 can still authenticate through conventional means, such as biometrics (e.g., fingerprints, voice, or retina features), user ID and password/PIN, or any other means decided by the user 102. Once authenticated, the user 102 may be asked whether the newly captured image should be used for subsequent authentication (e.g., whether the old reference image should be replaced). The user 102 can choose to replace an old reference image, which causes the newly captured image to be stored as an authentication reference image. The user 102 may also be asked at what level authentication the new image provides. In this way, the user 102 can change a reference image at any time, and the system can dynamically learn and change.

In certain embodiments, after a failed authentication attempt through item recognition, higher or stepped-up security is imposed on the user account. For example, a 4-digit PIN may be required before a user is granted access to the user account. Should the user provide a wrong PIN, the user can be required to provide an 8-digit password. If the user provides a wrong password, the user may be required to answer three or more security questions.

Advantageously, the described systems and methods authenticate a user without the use of complicated and easily forgotten usernames and passwords. A user simply assigns one or more items (e.g., personal items) for authentication, and captures an image of the items when the user wants to be authenticated to an application. Security is increased because knowing what item is being used for authentication and copying the item is difficult.

Figure 3:
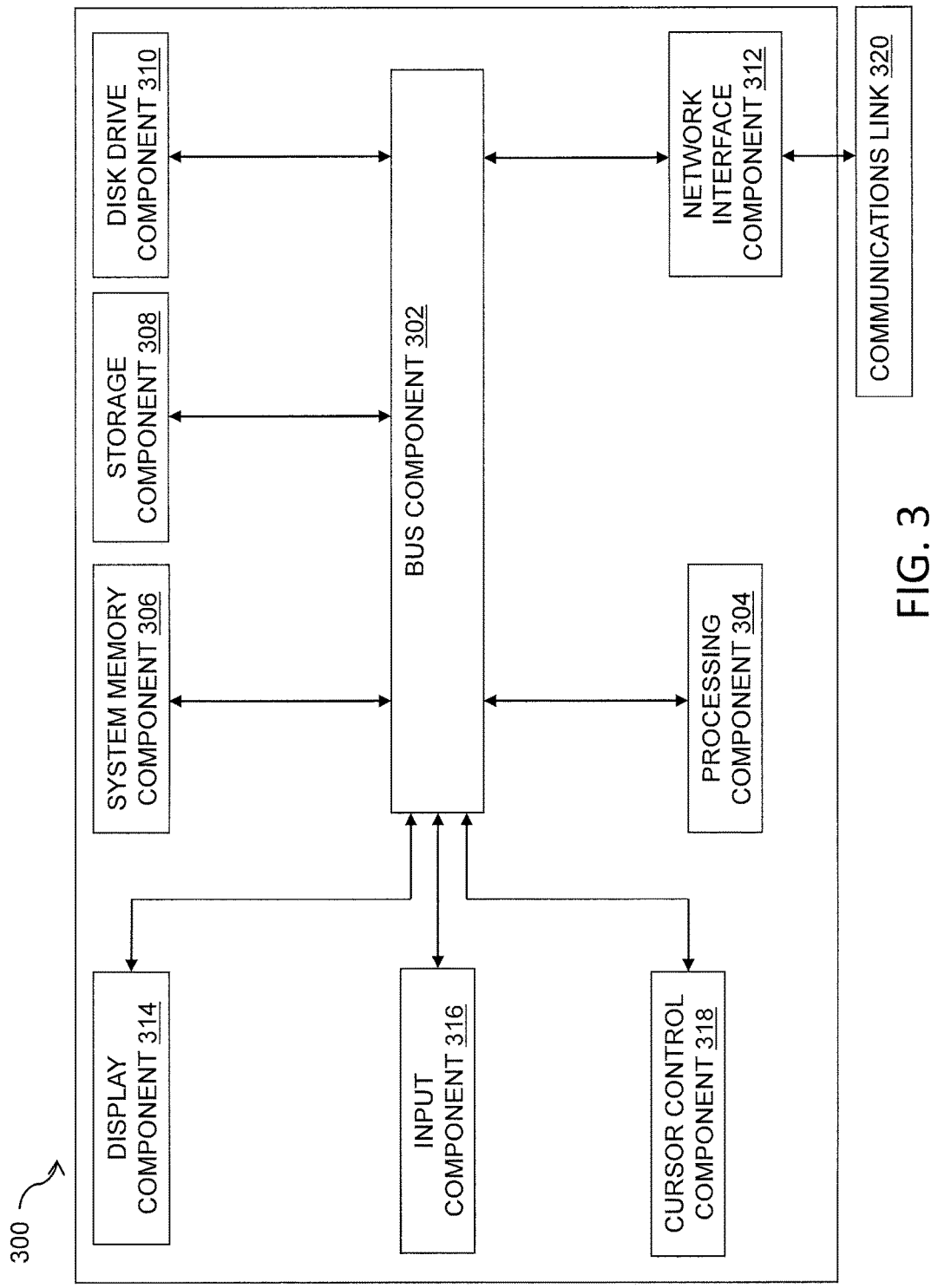
FIG. 3 is a block diagram of a system for implementing one or more components in FIG. 1 according to an embodiment of the present disclosure.

Referring now to FIG. 3, a block diagram of a system 300 is illustrated suitable for implementing embodiments of the present disclosure, including mobile device 120 and service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. In other embodiments, hardwired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching, auto-synchronizing, storing access control information, making payments, or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for electronically authenticating a user.

Although various components and steps have been described herein as being associated with mobile device 120 and service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for authenticating a user, comprising:
   a non-transitory memory; and
   one or more hardware processors coupled to the non-transitory memory and configured to read instructions from the non-transitory memory to cause the system to perform operations comprising:
   receiving, from a mobile device of a user, a request for accessing a user account;
   in response to receiving the request, obtaining an image captured by a camera of the mobile device;
   applying one or more image recognition algorithms to the captured image to extract a first set of features related to a first item in the captured image;
   comparing the first set of features to stored features associated with a plurality of reference items designated for authenticating the user of the user account to determine that the first item in the captured image matches a first reference item in the plurality of reference items;
   applying the one or more image recognition algorithms to the captured image to extract a second set of features related to a second item in the captured image;

comparing the second set of features to the stored features associated with the plurality of reference items designated for authenticating the user of the user account to determine that the second item in the captured image matches a second reference item in the plurality of reference items, wherein the first and second reference items are associated with a reference location;

determining a color of a third item in the captured image;

determining that a location of the mobile device corresponds to the reference location associated with the first and second reference items based at least in part on the color of the third item in the captured image;

determining, based on analyzing the captured image, that the first item and the second item are within a geographical boundary associated with the location of the mobile device;

in response to determining that the location of the mobile device corresponds to the reference location and that the first item and the second item are within the geographical boundary, granting the mobile device access to the user account according to a first access level;

retrieving additional descriptions of the first reference item, wherein the additional descriptions represent one or more characters or symbols appearing on the first reference item;

applying at least one of an optical character recognition algorithm or a pattern recognition algorithm to a portion of the captured image representing the first item to extract a third set of features related specifically to the first item, wherein the third set of features comprises at least one of a character or a symbol that appears on the first item;

comparing the third set of features against the additional descriptions associated with the first reference item to determine that the third set of features matches the additional descriptions; and in response to determining that the third set of features matches the additional descriptions, granting the mobile device access to the user account according to a second access level that is less restrictive than the first access level.

2. The system of claim 1, wherein the plurality of reference items comprises at least one of a piece of jewelry, a key, a piece of clothing, an accessory, a keychain, a picture, a tool, or a book.

3. The system of claim 1, wherein each reference item in the plurality of reference items is assigned one or more access levels for accessing the user account, and wherein the first access level and the second access level are determined based on the one or more access levels assigned to at least one of the first reference item or the second reference item.

4. The system of claim 1, wherein determining that the location of the mobile device corresponds to the reference location is further based on metadata extracted from the captured image.

5. The system of claim 1, wherein determining that the location of the mobile device corresponds to the reference location is further based on global positioning system (GPS) coordinates obtained from a geo-location component of the mobile device.

6. The system of claim 1, wherein the operations further comprise generating a score representing an accuracy of determining that the first item in the captured image matches the first reference item.

7. The system of claim 6, wherein the first access level is determined based at least in part on the score.

8. The system of claim 1, wherein the first access level indicates an access to view transactions related to the user account, wherein the second access level indicates an access to perform a transaction with the user account.

9. A method of authenticating a user, comprising:

receiving, from a mobile device of a user by one or more hardware processors, a request for accessing a user account;

in response to receiving the request, automatically obtaining an image captured by a camera of the mobile device;

extracting, from the captured image by the one or more hardware processors, a first set of features associated with at least a first item and a second item in the captured image by applying one or more image recognition algorithms to the captured image;

comparing, by the one or more hardware processors, the first set of features and the second set of features to stored features associated with a plurality of reference items designated for authenticating the user of the user account to determine that the first item in the captured image matches a first reference item in the plurality of reference items and that the second item in the captured image matches a second reference item in the plurality of reference items, wherein the first and second reference items are associated with a reference location;

determining, by the one or more hardware processors, a color of a third item in the captured image;

determining, by the one or more hardware processors, that a location of the mobile device corresponds to the reference location associated with the first and second reference items based at least in part on the color of the third item in the captured image;

determining, by the one or more hardware processors based on analyzing the captured image, that the first item and the second item are within a geographical boundary associated with the location of the mobile device;

in response to determining that the location of the mobile device corresponds to the reference location and that the first item and the second item are within the geographical boundary, granting, by the one or more hardware processors, the mobile device access to the user account according to a first access level;

retrieving, by the one or more hardware processors, additional descriptions of the first reference item, wherein the additional descriptions represent one or more characters or symbols appearing on the first reference item;

extracting, from the captured image by the one or more hardware processors, a second set of features by applying at least one of an optical character recognition algorithm or a pattern recognition algorithm to a portion of the captured image representing the first item, wherein the second set of features comprises at least one of a character or a symbol that appears on the first item;

comparing, by the one or more hardware processors, the second set of features against the additional descriptions associated with the first reference item to determine that the second set of features matches the additional descriptions; and in response to determining that the second set of features matches the additional descriptions, granting, by the one or more hardware processors, the mobile device access to the user account according to a second access level that is less restrictive than the first access level.

10. The method of claim 9, wherein each reference item in the plurality of reference items is assigned one or more access levels for accessing the user account, and wherein the first access level and the second access level are determined based on the one or more access levels assigned to at least one of the first reference item or the second reference item.

11. The method of claim 9, wherein determining that the location of the mobile device corresponds to the reference location is further based on global positioning system (GPS) coordinates obtained from a geo-location component of the mobile device.

12. The method of claim 9, further comprising generating a score representing an accuracy of determining that the first item in the captured image matches the first reference item.

13. The method of claim 12, wherein the first access level is determined based at least in part on the score.

14. The method of claim 9, wherein the first access level designates a first spending limit with the user account and the second access level designates a second spending limit that is higher than the first spending limit.

15. A non-transitory machine-readable medium having stored thereon machine-readable instructions executable to cause a machine to perform operations comprising:
   receiving, from a mobile device of a user, a request for accessing a user account;
   in response to receiving the request, obtaining an image from a camera of the mobile device;
   applying one or more image recognition algorithms to the captured image to extract a first set of features related to a first item in the captured image;
   comparing the first set of features to stored features associated with a plurality of reference items designated for authenticating the user of the user account to determine that the first item in the captured image matches a first reference item in the plurality of reference items;
   applying the one or more image recognition algorithms to the captured image to extract a second set of features related to a second item in the captured image;
   comparing the second set of features to the stored features associated with the plurality of reference items designated for authenticating the user of the user account to determine that the second item in the captured image matches a second reference item in the plurality of reference items, wherein the first and second reference items are associated with a reference location;
   determining a color of a third item in the captured image;
   determining that a location of the mobile device corresponds to the reference location associated with the first and second reference items based at least in part on the color of the third item in the captured image;
   determining, based on analyzing the captured image, that the first item and the second item are within a geographical boundary associated with the location of the mobile device;
   in response to determining that the location of the mobile device corresponds to the reference location and that the first item and the second item are within the geographical boundary, granting the mobile device access to the user account according to a first access level;
   retrieving additional descriptions of the first reference item, wherein the additional descriptions represent one or more characters or symbols appearing on the first reference item;
   applying at least one of an optical character recognition algorithm or a pattern recognition algorithm to a portion of the captured image representing the first item to extract a third set of features related specifically to the first item, wherein the third set of features comprises at least one of a character or a symbol that appears on the first item;
   determining whether the third set of features matches the additional descriptions associated with the first reference item; and
   in response to determining that the third set of features matches the additional descriptions, granting the mobile device access to the user account according to a second access level that is less restrictive than the first access level.

16. The non-transitory machine-readable medium of claim 15, wherein the third set of features comprises a word.

17. The non-transitory machine-readable medium of claim 15, wherein each reference item in the plurality of reference items is assigned one or more access levels for accessing the user account, and wherein the first access level and the second access level are determined based on the one or more access levels assigned to at least one of the first reference item or the second reference item.

18. The non-transitory machine-readable medium of claim 15, wherein determining that the location of the mobile device corresponds to the reference location is further based on metadata extracted from the captured image.

19. The non-transitory machine-readable medium of claim 15, wherein determining that the location of the mobile device corresponds to the reference location is further based on global positioning system (GPS) coordinates obtained from a geo-location component of the mobile device.

20. The non-transitory machine-readable medium of claim 15, wherein the first access level designates a first spending limit with the user account and the second access level designates a second spending limit that is higher than the first spending limit.

* * * * *